March 19, 1929. A. J. WEST 1,705,628
SYSTEM FOR COOLING ENGINE CYLINDERS
Filed Sept. 29, 1925
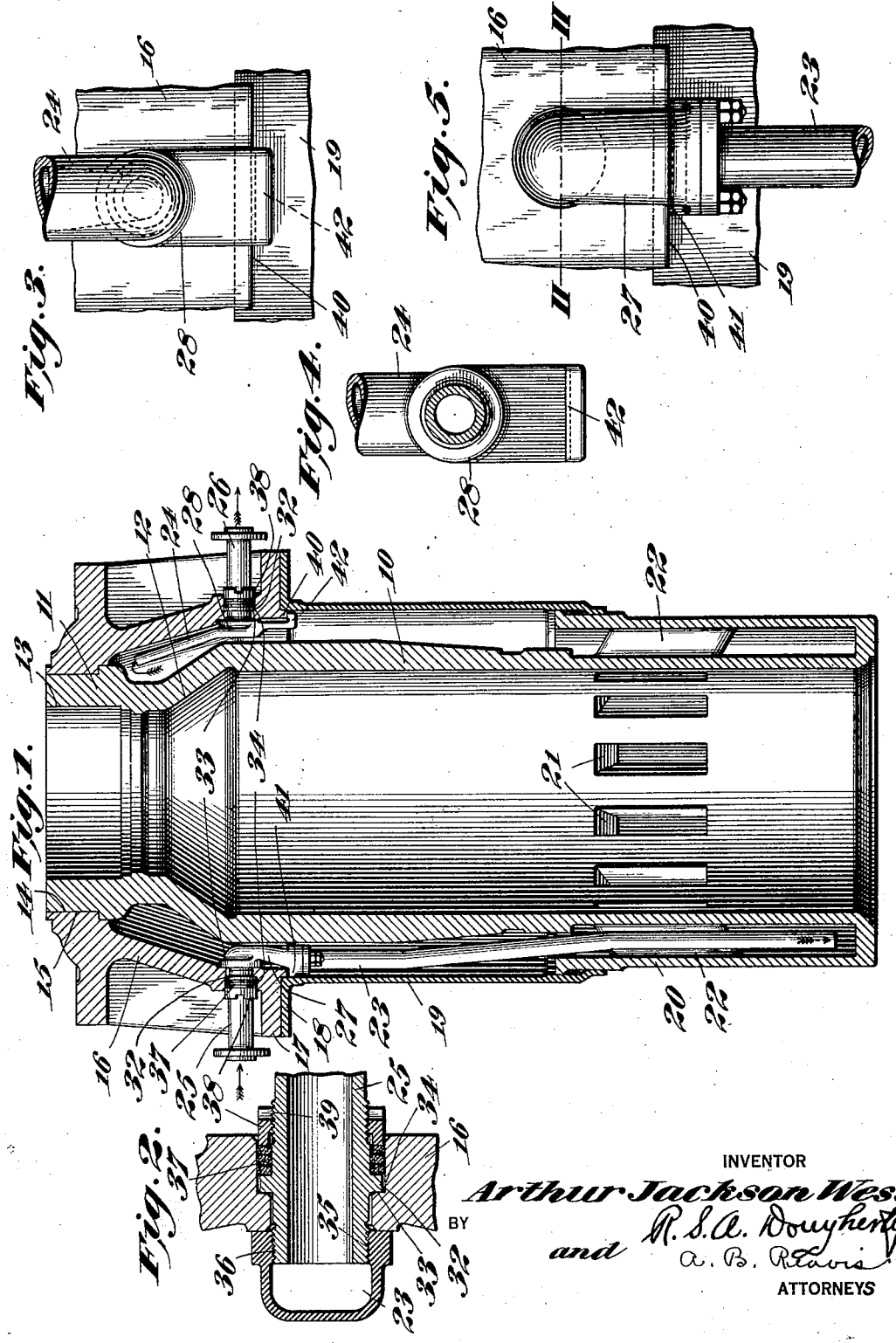
INVENTOR
Arthur Jackson West
BY R. S. A. Dougherty
and A. B. Reavis
ATTORNEYS Patented Mar. 19, 1929.

1,705,628

UNITED STATES PATENT OFFICE.

ARTHUR JACKSON WEST, OF BETHLEHEM, PENNSYLVANIA, ASSIGNOR TO BETHLEHEM STEEL COMPANY.

SYSTEM FOR COOLING ENGINE CYLINDERS.

Application filed September 29, 1925. Serial No. 59,268.

My invention relates to a cooling system for engine cylinders, more particularly to that type of engine cylinder disclosed and claimed in my application, Serial No. 422,753, filed November 9, 1920, and it has for an object to provide apparatus of this character which shall be simple from the standpoint of construction, which shall be effective to admit cooling fluid near to the bottom of the cooling space so that an annular column of cooling fluid may fill and move up through the jacket space and pass out the outlet adjacent to the top of said space, and which shall be capable of assembly while the cylinder and jacket construction is being assembled, the interiorly arranged portions of such cooling system being incapable of coming loose while the cylinder is in service.

More particularly, my invention relates to an arrangement of inlet and outlet conduit members carried by a supporting jacket member construction such as disclosed and claimed in my application, Serial No. 59,268, filed Sept. 29, 925, and it has for an object to provide conduit members carried by the supporting jacket member for the admission and withdrawal of cooling fluid from the jacket space, each of the conduit members including conduits passing through the wall of said jacket member and terminating in threaded ends within the jacket space to receive threaded elbows of conduits passing, respectively, to opposite ends of the cooling jacket space.

Apparatus made in accordance with my invention is illustrated in the accompanying drawings, forming a part of this application, in which:

Fig. 1 is a vertical sectional view of an engine cylinder incorporating my improved cooling system;

Fig. 2 is a detail sectional view showing the connection of conduit members;

Figs. 3 and 4 are detail views of the outlet elbow connection; and

Fig. 5 is a detail view of the inlet elbow connection.

Referring now to the drawings for a better understanding of my invention, in Fig. 1, I shown an engine cylinder 10 having a contracted portion 11 at its combustion end, the contracted portion including a flaring portion 12 and a neck portion 13, the flaring portion defining a contracted or converging combustion space. The neck portion 13 is provided with an external circumferential joint 14 for cooperation with a joint portion 15 carried by the supporting jacket member 16. The supporting jacket member 16 has a supporting flange 17 at its lower end which is adapted to rest upon and be secured in place with respect to an outwardly-extending flange 18 of an intermediate or bridging jacket member 19 having a telescopic fit with respect to a lower jacket member 20 integral with the lower end of the cylinder 10. The cylinder 10 is provided with exhaust oulets 21 adjacent to its lower end, these outlets being provided by conduits 22 which are integral with the cylinder 10 and with the jacket member 20 and bridge the jacket space. From the structure described, it will be apparent that the jacket members 16, 19 and 20 cooperate to define an annular jacket space extending from the lower end of the cylinder to the top thereof well above the flaring or converging combustion end 12, whereby the cylinder may be bathed by a continuous annular column of fluid from immediately above exhaust conduits 22 to a region above the upper end of the combustion space, the cooling fluid starting as an annular column at the bottom of the cooling space and being divided and diffused by the conduits 22, whereby the latter are effectively cooled. In order to produce an upwardly moving annular column of cooling fluid for this purpose, I provide an inlet conduit member 23 passing through the wall of the supporting jacket member 16, secured in place with respect to the latter, and terminating adjacent to the lower end of the cooling space. Heated cooling fluid passes from the top portion of the cooling space by an outlet conduit member 24, which also passes through the wall of the supporting jacket member 16 and is secured in place with respect to the latter.

The inlet and outlet conduit members 23 and 24 include conduits 25 and 26, respectively, which extend through the wall 16 of the supporting jacket member and have secured to their inner ends elbow portions 27 and 28, the elbow portion 27 having a conduit member 23 secured thereto of sufficient length to reach to the bottom of the cooling space and the elbow member 28 being preferably integral with the outlet conduit member 24 extending adjacent to the top of the cooling space.

The features of the joints between the conduit members 25 and 26 and the elbows 27 and 28, respectively, are similar, as shown in Fig. 2; and the same reference characters will be used to refer to such features wherever incorporated in either joint. Each of the conduit members 25 and 26 is provided with an external rib or shoulder 32, the front face of which is adapted to fit against a shoulder 33 provided by a countersunk opening 34 extending through the wall 16. The portion of the conduit arranged forwardly of the shoulder 32 and extending through the portion of the opening 34 of smaller diameter is threaded at 35 internally of the cooling space to receive internal threads 36 carried by an elbow. In order to minimize leakage through this joint construction, I show packing 37 arranged in the portion of the opening of larger diameter and held tightly in place between the shoulder 32 and a ring nut 38 which engages external threads 39 on a conduit member.

It is desirable, owing to the threaded connection between the elbows and the inlet and outlet conduits that the elbows should be prevented from turning. To this end, it will be seen, from Fig. 1, where the jacket member 18 is shown of larger internal diameter than the internal diameter of the adjacent portion of the supporting jacket member 16, thereby leaving a shoulder or ledge 40, that the elbow 27 is provided with a lug or projection 41 adapted to engage beneath the shoulder 40 and that the elbow 28 is provided with a similar lug 42 for the same purpose. After assembly, it is impossible for either of the conduits 23 or 24 and its connected elbow member to swing or turn within the cooling jacket space, whereby it is assured that these parts will be maintained permanently in position while a cylinder is in service. It will be apparent to those skilled in the art that any suitable means may be used to prevent or limit movement of the elbow members 27 and 28 about the axes of their internal threads.

From the structure described, it will be apparent that the inlet and outlet conduit constructions may be permanently fastened in position with respect to a supporting jacket member 16 either before or after the latter is secured in place with respect to a cylinder. Thereafter, a cylinder, with these conduit members assembled with respect to the supporting jacket member 16, may have an intermediate or bridging jacket member 18 brought into place, when the cylinder and the jacket structures are ready to be mounted on the engine supporting structure.

Having thus described my invention, what I claim as new and desire to secure by Letters Patent is:—

1. The combination, with an engine cylinder and a multiple-part jacket construction defining a cooling space with respect thereto, one of said jacket parts being secured in place with respect to the combustion end of the cylinder and projecting inwardly with respect to the adjacent jacket member to provide an annular ledge or shoulder, of inlet and outlet conduits passing through the wall of and secured to said jacket member and having threaded ends within the jacket space, inlet and outlet conduit members in the jacket space and having open ends respectively adjacent to opposite ends of said space, elbow portions carried by the inlet and outlet conduit members and having threads for engagement with the inlet and outlet conduit threads, and means carried by the elbows and abutting said ledge to prevent turning thereof.

2. The combination, with an engine cylinder and a multiple-part jacket construction defining a cooling space with respect thereto, one of said jacket parts being secured in place with respect to the combustion end of the cylinder and adapted to support the cylinder and jacket construction, of inlet and outlet conduits passing through the wall of said secured jacket member and having shoulders bearing externally against the latter and having threaded portions which extend internally thereof, inlet and outlet conduit members in the jacket space and having open ends, respectively, adjacent to opposite ends of said space, elbow portions carried by the inlet and outlet conduit members and having threads for engagement with the inlet and outlet conduit threads, and means associated with said elbows for engaging the supported jacket part for preventing turning movement of such elbows about the axes of their threads.

3. In combination, an engine cylinder and a multiple jacket construction defining a cooling space, said jacket construction including an upper jacket member removably mounted on said cylinder surrounding the combustion zone of said cylinder and terminating short of the opposite end thereof and having a pair of apertures formed in the wall thereof, conduits extending through each of said apertures to the interior of said cooling space, fluid tight means sealing the joint between said jacket member and said conduits, an elbow connected to one of said conduits for extending that conduit upwardly to the upper reaches of said cooling space, and an elbow connected to the other of said conduits for extending the latter conduit beyond said upper jacket member to the lower reaches of said cooling space.

In testimony whereof I hereunto affix my signature this 18th day of September 1925.

ARTHUR JACKSON WEST.